United States Patent

Sato

[15] 3,682,057
[45] Aug. 8, 1972

[54] APPARATUS FOR ADJUSTING THE ELECTRONIC SHUTTER OF A "THROUGH-THE-LENS" TYPE CAMERA

[72] Inventor: Takayoshi Sato, Tokyo, Japan
[73] Assignee: Kabushikikaisha COPAL, Tokyo, Japan
[22] Filed: Oct. 13, 1970
[21] Appl. No.: 80,317

[30] Foreign Application Priority Data

Oct. 27, 1969 Japan .....................44/85229

[52] U.S. Cl..............................................95/10 CT
[51] Int. Cl.........................................G03b 7/08
[58] Field of Search........................95/10 CE, 10 CT

[56] References Cited

UNITED STATES PATENTS 3,324,779  6/1967  Nobusawa et al..........95/10 X
3,353,462  11/1967  Suzuki............................95/10

Primary Examiner—Samuel S. Matthews
Assistant Examiner—Michael L. Gellner
Attorney—Kelman and Berman

[57] ABSTRACT

The electronic shutter of a "through-the-lens" type photographic camera is adjusted to compensate for exposure factors such as the speed of the film in use, and the aperture of the camera lens. The camera is of the type that includes an integrating circuit having a first light-sensitive photocell receiving light through the camera lens, and memory and exposure control circuits each respectively including second and third photocells receiving light directly from the object to be photographed.

In a first embodiment of the invention coupled diaphragms are positioned in front of the first and at least one, or both, of the second and third photocells. Thus, as the aperture of the first photocell is altered to compensate for exposure factors there will be a corresponding alteration in the aperture of the other photocells, thereby maintaining a constant resistance ratio therebetween.

In another embodiment of the invention, the variable diaphragm associated with the first photocell is mechanically coupled with a variable capacitor in the memory circuit, thereby ensuring proper exposure over a wide range of light exposure conditions.

14 Claims, 3 Drawing Figures

PATENTED AUG 8 1972
3,682,057
FIG. 1
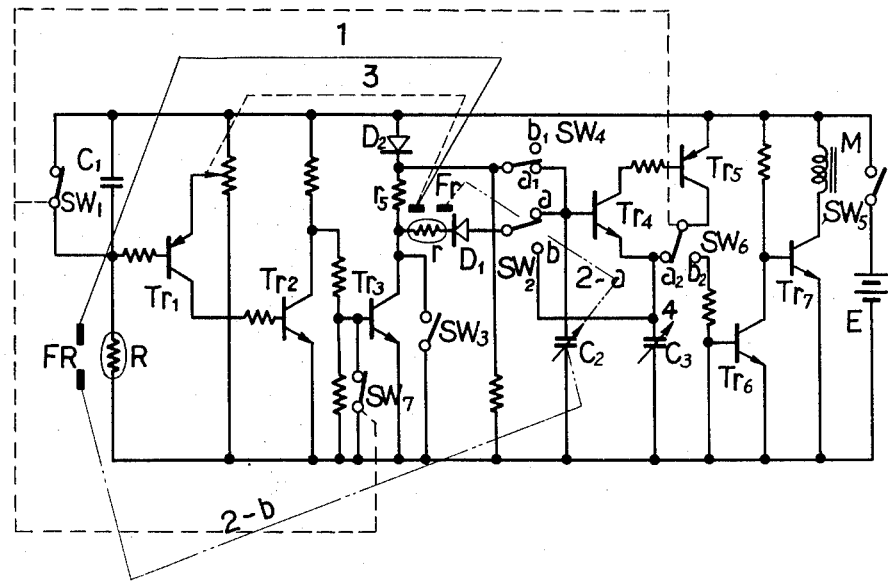
FIG. 2
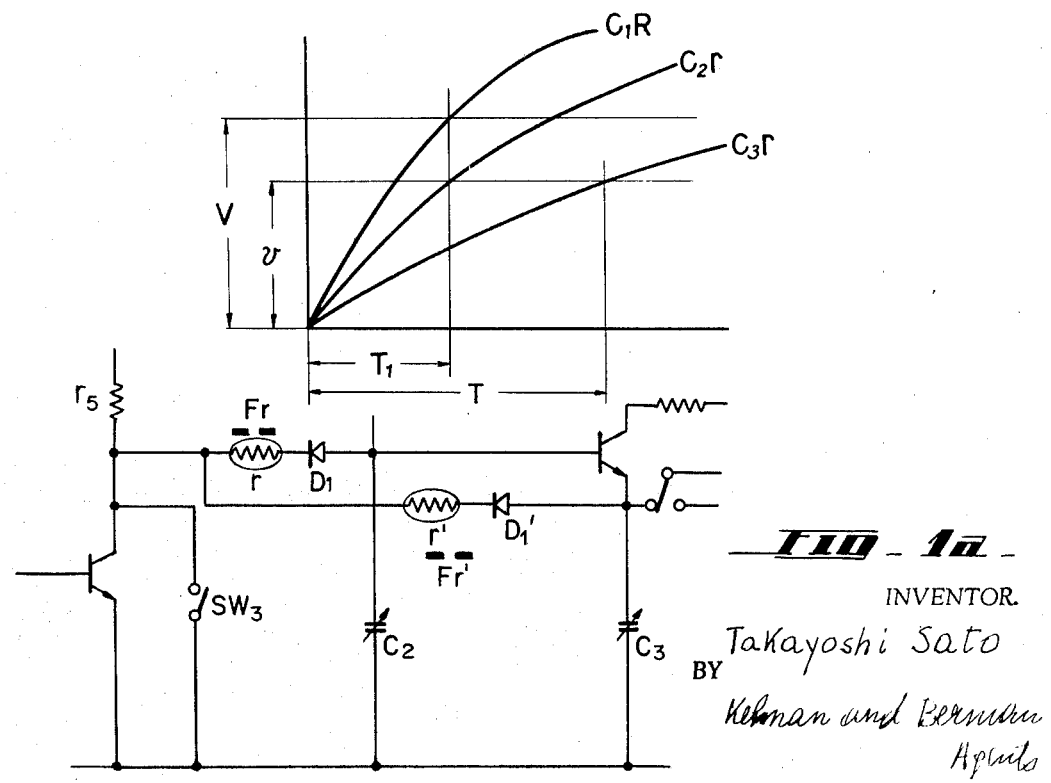
FIG. 1a
INVENTOR.
Takayoshi Sato
BY Kelman and Berman
Agents 3,682,057

APPARATUS FOR ADJUSTING THE ELECTRONIC SHUTTER OF A "THROUGH-THE-LENS" TYPE CAMERA

BACKGROUND OF THE INVENTION

The present invention relates to apparatus for adjusting the electronic shutter of a through-the-lens type camera for proper exposure of the film therein in accordance with exposure factors such as the sensitivity of the film and the aperture of the objective lens.

The present invention is an improvement in the invention disclosed in U.S. patent application Ser. No. 63,214, filed Aug. 12, 1970 by the same applicant as this application.

The electronic shutter disclosed in the above described U.S. patent application is actuated as follows. During the first part of the operation of the shutter release of the camera, light from the object to be photographed is received through the lens of the camera by a photoelectric element, such as a photoconductive element or a photovoltaic element connected in an integrating circuit having transistors and a capacitor. In this manner a reference time period is established in the integrating circuit in accordance with the intensity of light received by the photoelectric element. During this reference time period a second photoelectric element in the camera receives light from the object to be photographed directly, without passing through the objective lens, so that a memory circuit connected to the integrating circuit, and having the above second photoelectric element, a transistor and a second capacitor therein, is actuated so as to electrically charge (or discharge) the second capacitor, through the second photoelectric element, thereby establishing a reference voltage in the memory circuit in accordance with the reference time period and the intensity of light received by the second photoelectric element. As the operation of the shutter release proceeds the shutter blade is opened, while an exposure control circuit, connected to the memory circuit and having a third photoelectric element, a transistor and a third capacitor therein, is actuated so as to electrically charge (or discharge) the third capacitor through the third photoelectric element which also receives light from the object to be photographed directly without passing through the objective lens. The voltage appearing on the third capacitor, during actuation of the exposure control circuit, is compared with the reference voltage established in the memory circuit, so as to actuate a switching circuit, connected to the exposure control circuit, when the voltage of the third capacitor reaches a predetermined value with respect to the reference voltage, thereby closing the shutter blade to obtain the proper exposure time, regardless of variations in the intensity of the light reflected from the object to be photographed after the shutter blade is opened to expose the film.

The second photoelectric element may double as the third photoelectric element, by switching the connections thereto from the memory circuit to the exposure control circuit.

A switch may be provided in the circuit to switch one of the transistors in the switching circuit so that it may be used to amplify the current to be given to the third capacitor, for preliminarily charging thereof, so that the third capacitor in the exposure control circuit is quickly charged, thereby permitting the time period between the commencement of actuation of the shutter release and the opening of the shutter blade to be shortened to prevent the failure of the shutter.

A resistor and one or more diodes may also be connected in the circuit so that the potential of the positive terminal of the second capacitor in the memory circuit is made equal to the potential of the collector of the transistor in the memory circuit which is provided for charging (or discharging) the second capacitor thereby positively preventing transfer of the electric charge in the second capacitor when the transistor of the memory circuit is non-conducting so that a high degree of accuracy in exposure control is assured.

In general, there are certain limitations to the allowable range of variations in factors such as the intensity of illumination incident upon the photoelectric elements, the capacitance of the capacitors, the charging (or discharging) voltages of the capacitors, and the resistance and the operating voltage of the transistors, when these parameters are varied in order to adjust an electronic shutter in accordance with exposure factors such as the sensitivity of the film used and the aperture for proper exposure. For instance, a photoconductive element such as CdS cell, has a time delay in the rise of its conductivity when subjected to light of low intensity, a hysterises effect, and a variation in resistance depending upon the intensity of light impinging thereon, so that a sufficient degree of accuracy in exposure control can not be obtained, if the permissible range in the intensity of light incident upon the photoconductive element is made too large. Similarly, the allowable range in the capacity of the capacitors, the operating voltages of the transistors, and the resistance of the transistors to obtain the proper exposure, are limited by limitations in the size and dimensions of the elements, the transfer of electric charge from the capacitor and variations in the gain of the transistors.

Therefore, it is very difficult to adjust an electronic shutter for proper exposure in accordance with exposure factors such as the sensitivity of the film used and the aperture, by simply adjusting only one of the variable factors used to compute the exposure such as the quantity of light incident upon the photoelectric element, the capacity of the capacitor and the bias voltage of the transistors if the range in the intensity of the light reflected from the object to be photographed is kept sufficiently great. If the above adjustment is effected by adjusting only one of the above variable factors, the allowable range in the intensity of light for proper exposure is made small, while the accuracy of the exposure is lowered.

SUMMARY OF THE INVENTION

The object of the present invention is to provide a novel and useful apparatus for adjusting an electronic shutter of a through-the-lens type photographic camera for proper exposure in accordance with exposure, factors such as the sensitivity of the film used and the aperture, by which the above described difficulties are eliminated and a high degree of accuracy in the exposure is obtained.

The above object is achieved, in accordance with the present invention, by selectively coupling some of the elements in the electronic shutter, such as the photoelectric elements, the memory capacitor, the exposure control capacitor, and the transistors in the memory and exposure control circuits, for cooperative adjustment therebetween, so that conditions representative of the sensitivity of the film and the aperture are introduced into the electronic shutter to obtain a high degree of accuracy in the exposure, while the allowable range in the intensity of light reflected from the object is kept large.

BRIEF DESCRIPTION OF THE DRAWINGS

FIG. 1 is a diagram showing an illustrative electric circuit according to the present invention;

FIG. 1a shows a variation of the circuit depicted in FIG. 1; and

FIG. 2 is a diagram showing the characteristic curves of the charging and discharging of the capacitors in the integrating circuit, memory circuit and the exposure control circuit of FIG. 1.

DETAILED DESCRIPTION OF THE PREFERRED EMBODIMENT

In FIG. 1, the integrating circuit comprises a photoelectric element R, a capacitor $C_1$ connected in series therewith and transistors $Tr_1$, and $Tr_2$ connected as shown. The memory circuit comprises a photoelectric element r, a capacitor $C_2$ connected in series therewith and a transistor $Tr_3$, connected as shown, with a pair of diodes $D_1$, and $D_2$, and a resistor $r_5$ being connected thereto. The exposure control circuit comprises a capacitor $C_3$, and a transistor $Tr_4$, connected as shown. Photoelectric element r can be connected in series with capacitor $C_3$ in the exposure control circuit by operating switches $SW_2$, $SW_3$. As described previously, photoelectric element R receives light from the object to be photographed through the objective lens of the camera, while photoelectric element r receives light from the object directly, without passing through the objective lens.

The switching circuit comprises transistors $Tr_5$, $Tr_6$ and $Tr_7$ and electromagnet or solenoid M for actuating shutter blade arresting means associated with the shutter to keep the blade in an opened state, for exposure of the film until it is deenergized.

Electric source E and switches $SW_1$–$SW_7$ are connected, as shown in FIG. 1, so as to complete the circuit.

The details of the electric circuit described above are disclosed in full in U.S. patent application Ser. No. 63,214, therefore, are not described in detail here.

FIG. 1 shows switches $SW_1$–$SW_7$ set for exposure of the camera. Upon winding up, or setting, of the camera, the shutter blade is kept opened in coupled relation with the winding up of the camera.

During the first part of the operation of the shutter release means switch $SW_5$ is closed so that capacitor $C_2$, which stores the reference voltage, is charged to the initial terminal voltage, through switch $SW_4$ (now connected to contact $a_1$) while capacitor $C_3$, for exposure control, is charged to the initial terminal voltage through switch $SW_6$ and amplifying transistor $Tr_5$. Then, transistor $Tr_4$ is rendered non-conductive and transistors $Tr_5$, $Tr_6$ are also rendered non-conductive. Thus, transistor $Tr_7$ is rendered conductive so as to actuate electromagnet M and thereby maintain the shutter blade arresting means in a condition to be ready to keep the shutter blade in the opened state. This condition is maintained, after switch $SW_4$ is opened by switching it to contact with contact $b_1$, for the next step of the operation. When switches $SW_1$, $SW_7$ are simultaneously opened, in accordance with further operation of the shutter release means to begin storage of the reference time period, capacitor C1 commences to charge through photoelectric element R, which now has a resistance $R_1$ corresponding to the intensity of light incident thereon after passing through the objective lens, so that the terminal voltage thereacross reaches the value V after time period $T_1$ according to the following equation:

$$T_1 = R_1 C_1 \log_e Vo/(Vo - V) \quad (1)$$

where:

$Vo$ = the voltage of the electric source applied to capacitor C1 for charging thereof.

$V$ = the voltage applied to the emitter of transistor $Tr_1$, i.e., the trigger voltage of transistor $Tr_1$ $C_1$ = the capacitance of capacitor $C_1$ $T_1$ = the reference time period required to charge capacitor $C_1$ until the terminal voltage reaches V.

Since resistance $R_1$ is determined by the intensity of light, reference time $T_1$ is inversely proportional to the intensity of light from the object passing through the objective lens.

After the lapse of time T1, 1transistor $Tr_1$ is rendered conductive by virtue of trigger voltage V. On the other hand, transistor $Tr_3$ has been kept non-conductive because no input has been supplied thereto by virtue of the closure of switch $SW_7$. When switch $SW_7$, is opened, together with switch $SW_1$ and switch $SW_6$ is switched to contact $b_2$, transistor $Tr_3$ is rendered conductive and capacitor $C_2$ which had been charged to the initial terminal voltage Vo, commences to discharge through photoelectric element r, which now has a resistance $r_1$ as determined by the intensity of light from the object incident upon photoelectric element r directly without passing through the objective lens, until transistor $Tr_1$ is rendered conductive after the lapse of time T1 thereby rendering transistor $Tr_3$ non-conductive. Thus, the discharging of capacitor $C_2$ is terminated. The terminal voltage v of capacitor $C_2$, when the discharging thereof is terminated, satisfies the following equation:

$$T_1 = r1 C_2 \log_e Vo/(Vo - v) \quad (2)$$

As is evident from Equations (1) and (2), the intensity of light reflected from the object to be photographed which passes through the lens is stored in capacitor $C_2$ in terms of the reference terminal voltage v thereacross.

The reflecting mirror within the camera is kept in the position which reflects light from the object towards the view finder, until the above described storage operation is terminated. Therefore, measurement of the intensity of light and the storage thereof are completely carried out before the film in the camera.

In order to effect exposure, switch $SW_2$ is preliminarily switched from contact $a$ to contact $b$ and switch $SW_3$ is closed in synchronism with the commencement of the opening of the shutter blade, by the last part of the operation of the shutter release means, so that the electric charge stored in capacitor $C_3$, having an initial terminal voltage of Vo, commences to discharge through photoelectric element v, which now has a resistance $r_3$, corresponding to the intensity of light incident thereon without passing through the objective lens, and switch $SW_3$, while the exposure of the film commences, the shutter blade being held in an opened state by the shutter blade arresting means actuated by electromagnet M.

The time period T in which the voltage of capacitor $C_3$ reaches the reference voltage v stored in capacitor $C_2$, after the discharging of capacitor $C_3$, is expressed as follows:

$$R = r_3 C_3 \log_e Vo/(Vo - v) \qquad (3)$$

After the lapse of time T, transistor $Tr_4$ is rendered conductive so that transistor $Tr_7$ is rendered non-conductive by the output of transistor $Tr_4$, as amplified by transistors $Tr_5$ and $Tr_6$, thereby deenergizing electromagnet M to deactivate the shutter blade arresting means. Thus, the shutter blade is closed to terminate exposure of the film so that the proper exposure is obtained.

The time T during which exposure of the film is effected is expressed as follows, by utilizing Equations (1), (2) and (3):

$$T = r_3 (R_1/r_1)(C_1 C_3/C_2) \log_e Vo/(Vo-V) \qquad (4)$$

Since the resistance $R_1$ of photoelectric element R and the resistance $r_1$ of photoelectric element r have their values established when the elements receive light from the object to be photographed at the same point of time, respectively, the ratio $R_1/r_1$ is constant the exact value is determined by the conditions of the object to be photographed.

Therefore, the exposure time T is inversely proportional to the intensity of light reflected from the object at the instant at which the exposure is effected, so that the proper exposure of the film is assured.

If the intensity of light reflected from the object is unchanged, then resistance $r_3$ will be equal to resistance $r_1$, so that the following relationship is obtained:

$$T = R_1 (C_1 C_3/C_2) \log_e Vo/(Vo-V) \qquad (5)$$

This relationship is the same as in the case of conventional electronic shutters.

As previously described, the connection of the resistor $r_5$, diodes $D_1$, and $D_2$ and switch $SW_6$ make it possible to prevent leakage of the electric charge on capacitor $C_2$ which charge stores the value of the reference voltage v so as to maintain a high degree of accuracy in the exposure control, and to charge exposure control capacitor $C_3$ quickly, thereby permitting the time required for the operation of the shutter to be shortened to prevent the failure.

From the above Equations (4) and (5), the exposure time T is expressed as follows:

$$T = \left( r_3 \log_e \frac{Vo}{Vo-V} \right) \frac{R_1}{r_1} \frac{C_1 C_3}{C_2} \qquad (6)$$

or $$T = \left( \log_e \frac{Vo}{Vo-V} \right) R_1 \frac{C_1 C_3}{C_2} \qquad (7)$$

In order to compensate for the sensitivity of the film and the lens aperture for the proper exposure in the electronic shutter, the exposure time T must be correspondingly be increased or decreased.

This may be done by adjusting some of the variable factors, such as $V$, $R_1$, $r_1$, $r_3$, $C_1$, $C_2$, $C_3$ in the above equations, in appropriately selected combinations thereof.

The reference voltage v is preferably kept constant, or at least the variation in the reference voltage kept very small in order to maintain a high degree of accuracy in the exposure over a wide range in the intensity of light, so that the exposure time can also be controlled over a wide range.

FIG. 2 shows the characteristic curves of charging capacitor $C_1$, connected to photoelectric element R, and discharging capacitors $C_2$, and $C_3$ connected to photoelectric element r, respectively. As shown, when the reference voltage v is kept constant (or the variation therein kept small), the variation in the characteristics of the transistors and in the capacitors which are affected by the operating voltage (and by the temperature) is also very small so that a wide range in the intensity of light can be stored and utilized to obtain the proper exposure.

Therefore, in accordance with the present invention, the above described factors are varied while the reference voltage v is kept constant (or the variation thereof kept very small).

In accordance with the present invention, a variable light limiting means $F_R$, such as a diaphragm stop or a neutral density filter, is located in front of photoelectric element R so as to controllably vary the quantity of light incident on photoelectric element R, while a second variable light limiting means Fr, similar to light limiting means $F_R$, is located in front of photoelectric element r so as to controllably vary the quantity of light incident on photoelectric element r, and capacitors $C_2$, $C_3$ are made variable capacitors, respectively. The above variable elements are selectively interconnected as described hereinbelow.

EXAMPLE 1

In this example, light limiting means $F_R$ and light limiting means Fr are operatively coupled with each other, as indicated by solid line 1 in FIG. 1, so that the quantity of light passing through each of light limiting means $F_R$ and Fr is varied correspondingly to the quantity of light passing through the other.

From equations (1), (2), $$\log_e Vo/(Vo-v) = (C_1/C_2)(R_1/r_1) \log_e Vo/(Vo-V) \quad (8)$$

In order to keep reference voltage v constant to achieve a wide range in the exposure time T, ratio $R_1/r_1$ must be made constant when the trigger voltage V of transistor $Tr_1$, and the capacity of each of capacitors $C_1$, $C_2$ are assumed to be fixed. Therefore, in order to introduce conditions representative of the film sensitivity and of the lens aperture into the circuit, so as to obtain the proper exposure, it suffices if light limiting means $F_R$ and Fr are correspondingly varied to supply the light from reflected object to photoelectric elements R, r while ratio $R_1/r_1$ is kept constant.

For example, if each of light limiting means $F_R$, Fr is adjusted to pass therethrough a quantity of light n times greater than the previous value, the following relationship is obtained, from Equation (4):

$$T = \frac{1}{n} r_3 \times \frac{C_1 C_3}{C_2} \times \frac{1/nR_1}{1/nr_1} \log_p \frac{Vo}{Vo-V}$$

$$= \frac{1}{n} r_3 \frac{C_1 C_3}{C_2} \left(\frac{R_1}{r_1}\right) \log_p \frac{Vo}{Vo-V}$$

This is so because the values of $R_1$, $r_1$, and $r_3$ are reduced to $1/n$ times the previous values, respectively.

Thus, the exposure time T is reduced to $1/n$ times the previous value when the quantity of light is increased to $n$ times the previous value, so that the proper exposure is obtained. Conditions representative of the sensitivity of the film and the lens aperture can be simultaneously introduced by differentially coupling these conditions into the circuit parameters or by the arrangement of the light limiting means in front of the respective photoelectric elements.

EXAMPLE 2

In this example, the light limiting means Fr is operatively coupled with variable capacitor $C_2$, or variable capacitor $C_1$, as indicated by dashed line 2-a in FIG. 1 so that the capacity of capacitor $C_2$ (or $C_1$) is proportionally (or inversely proportionally) varied with respect to the variation in the light transmission limiting means Fr.

In the case indicated by dashed line 2-a in FIG. 1, when the light transmission of limiting means Fr is varied to a value $1/n$ times the previous value, in order to introduce conditions representative of the film sensitivity and the lens aperture into the circuit, the capacity of capacitor $C_2$ is also varied to a value which is $1/n$ times the previous value. Therefore, the resistance of photoelectric element $r$ is made $nr_1$ during the storage of the reference voltage, while the capacity of capacitor $C_2$ is made $1/n$ $C_2$ so that the following relationship is obtained, from Equation (8):

$$\log \frac{Vo}{Vo-v} = \frac{C_1}{\frac{1}{n}C_2}\left(\frac{R_1}{nr_1}\right) \log \frac{Vo}{V-V}$$

$$= \frac{C_1}{C_2}\left(\frac{R_1}{r_1}\right) \log_p \frac{Vo}{Vo-V}$$

Since the resistance $r_1$, is proportional to resistance $R_1$ as previously described, ratio $R_1/r_1$ is constant. Therefore, reference voltage $v$ is made constant. The exposure time $T$ is expressed as follows, on the basis of Equation (4):

$$T = nr_3 \frac{R_1}{nr_1} \times \frac{C_1 C_3}{\frac{1}{n}C_2} \log_p \frac{Vo}{Vo-V}$$

$$= nr_3 \left(\frac{R^1}{r_1}\right) \times \frac{C_1 C_3}{C_2} \log_p \frac{Vo}{Vo-V}$$

because the resistance of element $r_1$, when used in the exposure control circuit, is made $nr_3$.

Since the right hand side of the above equation is constant, except for the value of $r_3$ during exposure, the exposure time $T$ is increased to $n$ times the previous value by the introduction of the conditions representative of the film sensitivity and the lens aperture so that the proper exposure is obtained.

Alternatively, light limiting means $F_R$ may be operatively coupled with capacitor $C_2$ (or capacitor $C_1$) as indicated by dashed line 2-b, in the same manner as in the above described example, except that the capacity of capacitor $C_2$ (or $C_1$) is inversely proportionally (or proportionally) varied with respect to the variation in the light transmission of light limiting means $F_R$.

In this case, as indicated by dashed line 2-b in FIG. 1, when the light transmission of light limiting means $F_R$ is varied to a value $1/n$ times the previous value, the capacity of capacitor $C_2$ is varied to a value $n$ times the previous value.

Thus, the following relationship is obtained from Equation (8):

$$\log \frac{Vo}{V-v} = \frac{C_1}{mC_2}\left(\frac{NR_1}{r_1}\right) \log \frac{Vo}{Vo-V} = \frac{C_1}{C_2}\frac{R_1}{r_1} \log_p \frac{Vo}{Vo-V}$$

Therefore, the reference voltage $v$ is kept constant. Since the capacity of capacitor $C_3$ is now $1/m$ times the capacity of capacitor $C_2$, the exposure time is made $1/n$ times the value which would be obtained if the capacity of capacitor $C_3$ were equal to that of capacitor $C_2$, thereby permitting the desired introduction of conditions representative of the film sensitivity and the lens aperture while the reference voltage $v$ is kept constant so that the proper exposure is obtained.

EXAMPLE 3

In this example, the emitter bias of transistor $Tr_1$ is varied in coupled relationship with the adjustment of light limiting means Fr as shown by broken line 3 in FIG. 1 in order to introduce the conditions of representative film sensitivity and the lens aperture into the circuit.

By varying the emitter bias of transistor $Tr_1$, the trigger voltage V of transistor $Tr_1$ is also varied so that, from Equation (4), the exposure time $T$ is varied for the proper exposure, because $R_1/r_1$ is constant. In order to keep the reference voltage $v$ constant while the light transmission of the light limiting means Fr is made $l/n$ times the previous value, the variable resistor which varies the trigger voltage V of transistor $Tr_1$ must be coupled with the light limiting means Fr in such a way so as to be adjusted to satisfy the following relationship, based on Equation (8):

$$(R_1/nr_1) \log_e Vo/(Vo-V) = A,$$

hence $$n = \frac{1}{A} \times \left(\frac{R_1}{r_1}\right) \log_p \frac{Vo}{Vo-V}$$

where $A$ is constant and the capacity of each of capacitors $C_1$, $C_2$ is assumed to be fixed.

Then, since the resistances $r_1$, $r_3$ of element $r$ are changed to $nr_1$, $nr_3$, respectively, Equation (4) is expressed as follows:

$$T = nr_3 \frac{C_1 C_3}{C_2} \frac{R_3}{nr_1} \log_p \frac{Vo}{Vo-V} = r_3 \frac{C_1 C_3}{C_2}\left(\frac{R_1}{r_1}\right) \log_p \frac{Vo}{Vo-V}$$

Therefore, by varying the trigger voltage V of transistor $Tr_1$, the exposure time is controlled to the desired value while the reference voltage $v$ is kept constant.

EXAMPLE 4

In this case, capacitor $C_3$ in the exposure control circuit is made variable as shown by numeral 4 in FIG. 1, so that the capacity of capacitor $C_3$ is adjusted in accordance with conditions representative of the film sensitivity and the lens aperture. In this case, light limiting means $F_R$, and Fr may be dispensed with, and the ratio $R_1/r_1$ is kept constant. That is, $$R_1/r_1 = N$$

where $N$ = constant.

From Equation (8)

$$\log_e \frac{Vo}{Vo-v} = \frac{C_1}{C_2} \log_e \frac{Vo}{Vo-V} \times N$$

Therefore, the reference voltage v does not vary substantially, thereby permitting a wide range of exposure time to be obtained without lowering the accuracy thereof.

When the exposure time $T$ is to be increased $n$ times, the capacity of capacitor $C_3$ is also increased $n$ times. Then $$T = r_3 \frac{C_1 n C_3}{C_2} \left(\frac{R_1}{r_1}\right) \log_e \frac{Vo}{Vo-V}$$

This method can be used in combination with other method described here.

EXAMPLE 5

This embodiment utilizes the concept of preventing the transfer of the electric charge on capacitor $C_2$ for the storage circuit disclosed in the above referenced U.S. patent application Ser. No. 63,214.

As previously described, capacitor $C_3$ can be quickly charged by means of switch $SW_6$ while the transfer of electric charge from capacitor $C_2$, through transistor $Tr_3$, is prevented by equalizing the voltage of capacitor $C_2$ with the collector voltage of transistor $Tr_3$ by the provision of diodes $D_1$, $D_2$ and resistor $r_5$. Thus capacitors $C_2$, $C_3$ can be made compact without lowering the accuracy while the range of storage is kept wide in order to introduce conditions representative of the film sensitivity and the lens aperture into the circuit. Since the capacity of capacitor $C_2$ may be made small, even though it is made variable, the cost of capacitor $C_2$ is low.

EXAMPLE 6

In this example, and as shown in FIG. 1a another photoelectric element $r'$ is provided solely for use in the exposure control circuit while photoelectric element $r$ is used exclusively in the memory circuit, and light limiting means $Fr'$ is located in front of photoelectric element $r'$ so as to introduce conditions representative of the film sensitivity and the lens aperture. The characteristics of photoelectric element $r'$ are made equal to those of photoelectric element $r$, thereby permitting the exposure time $T$ to be varied without varying the reference voltage $v$.

From Equations (1), (2), (3)

$$T_1 = R_1 C_1 \log_e Vo/(Vo-V) \quad (1)'$$
$$T_1 = r_1 C_2 \log_e Vo/(Vo-v) \quad (2)'$$
$$T = r_3' C_3 \log_e Vo/(Vo-v) \quad (3)'$$

Therefore, $$T = \frac{R_1 r_3'}{r'} \times \frac{C_1 C_3}{C_2} \log_e \frac{Vo}{Vo-V} \quad (4)'$$

Thus, when the light transmission of light limiting means $r'$ is made $1/n$ times the previous value, in order to introduce conditions representative of the film sensitivity and the lens aperture into the circuit, Equation (4)' is expressed as follows:

$$T = (R_1/r_1) n r_3' (C_1 C_3/C_2) \log_e Vo/(Vo-V)$$

Therefore, the exposure time $T$ can be varied in accordance with the conditions introduced in the circuit. Further, from Equations (1)', (2)', $$\log_e Vo/(Vo-V) = (R_1 C_1/r_1 C_2) \log_e Vo/(Vo-V)$$

Since $R_1/r_1$ is constant, reference voltage $v$ is kept substantially constant.

This example has the advantage that the switching operation of the circuit is simplified, because the capacity of each of the capacitors is not varied.

In the above description, capacitors $C_2$, $C_3$ have been described as being preliminarily charged, prior to exposure, and then discharged to obtaining exposure control, until the reference voltage is obtained in each of capacitors $C_2$, $C_3$. It is apparent, however, that the preliminary charging may be dispensed with, and capacitors $C_2$, $C_3$ may be charged to obtain the reference voltage rather than discharged as disclosed in the above described U.S. patent application.

I claim:

1. Apparatus for adjusting the electronic shutter of a "through-the-lens" camera of the type that includes an integrating circuit, a memory circuit connected to the integrating circuit, and an exposure control circuit connected to the memory circuit for controlling said shutter, the integrating circuit including a first capacitor, a first photoelectric element receiving, through the lens of said camera, light from the object to be photographed, said first capacitor and said first photoelectric element being serially connected across a voltage source by the closure of a first pair of switch contacts mechanically coupled to the shutter release of said camera when said release is actuated, the integrating circuit further including a transistorized trigger circuit connected to said first capacitor, said trigger circuit switching its state and forwarding a signal to said memory circuit after a time interval proportional to the amount of light received by said first photoelectric element, said memory circuit including a second capacitor, a second photoelectric element receiving light directly from said object, and a transistor, said second photoelectric element, said second capacitor and said transistor being serially connected, said second capacitor being charged by said voltage source when said shutter release is actuated to close said first pair of switch contacts and then discharging, through said second photoelectric element when further actuation of said shutter release opens a second pair of switch contacts serially connected in the charging path of said second capacitor, until the signal is received from said integrating circuit to switch the state of said transistor, whereby a reference voltage is stored on said second capacitor proportional to the intensity of the light reflected from the object to be photographed, said exposure control circuit including a third capacitor, a third photoelectric element receiving light directly from said object, and a switching circuit including a transistor and electromagnetic shutter arresting means, said third capacitor being initially charged by said voltage source when said first pair of switch contacts are closed and actuating said switching circuit to energize said shutter-arresting means, said third capacitor subsequently discharging through said third photoelectric element by closure of a third pair of switch contacts connected across the transistor in said memory circuit, said third pair of contacts being mechanically coupled to said shutter release and closed by further actuation of said release, until the voltage across said third capacitor equals the voltage stored in said second capacitor whereupon said switching circuit de-energizes said shutter-arresting means to permit said shutter to close and thereby properly expose the film in said camera, whereby the improvement comprises the fact that at least one of the parameters of the elements comprising said shutter adjusting apparatus is varied in accordance with the exposure factors affecting the exposure of the film in said camera, said parameters being selected from the group consisting of:

a. the resistance of said first photoelectric element;
b. the resistance of said second photoelectric element;
c. the resistance of said third photoelectric element;
d. the capacitance of said first capacitor;
e. the capacitance of said second capacitor;
f. the capacitance of said third capacitor; and
g. the threshold level of said transistorized trigger circuit, whereby the proper exposure of the film in said camera is effected while the reference voltage stored in said second capacitor remains essentially unaltered, over a wide range of light conditions.

2. The apparatus according to claim 1, further comprising switching means to associate said second photoelectric element with said exposure control circuit so that said second photoelectric element may double as said third photoelectric element.

3. The apparatus according to claim 2, further comprising first and second adjustable light limiting means positioned in front of said first and second photoelectric elements, respectively, said light limiting means being mechanically coupled one to the other such that opening the aperture of one of said light limiting means to admit n times the light previously admitted will correspondingly alter the aperture of the other light limiting means to admit n times the light previously admitted so that the ratio of resistance of said first photoelectric element to the resistance of said second photoelectric element is held constant, regardless of the adjustment of either of said first or second light limiting means.

4. The apparatus according to claim 2, wherein said second capacitor is a variable capacitor, and the apparatus further comprises an adjustable light limiting means positioned in front of said second photoelectric element, said second capacitor being mechanically coupled to said light limiting means such that the capacitance of said second capacitor is varied proportionally to the light transmission through said light limiting means.

5. The apparatus according to claim 2, wherein said second capacitor is a variable capacitor and the apparatus further comprises an adjustable light limiting means positioned in front of said first photoelectric element, said second capacitor being mechanically coupled to said light limiting means such that the capacitance of said second capacitor is varied proportionally to the light transmission through said light limiting means.

6. The apparatus according to claim 2, wherein said integrating circuit includes means for varying the threshold of said trigger circuit, the apparatus further comprising an adjustable light limiting means positioned in front of said second photoelectric element, said threshold varying means being mechanically coupled to said light limiting means such that said threshold is varied proportionally to the light transmission through said light limiting means, whereby said reference voltage remains essentially constant over a wide range of light conditions.

7. The apparatus according to claim 2, wherein said third capacitor is a variable capacitor, the capacitance of said third capacitor being varied in accordance with the exposure factors affecting the exposure of the film in said camera, whereby the correct exposure of said film is attained while keeping the reference voltage essentially constant.

8. The apparatus according to claim 1, further comprising first, second and third adjustable light limiting means positioned in front of said first, second and third photoelectric elements, respectively, said light limiting means being mechanically coupled one to the other such that opening the aperture of any one of said light limiting means to admit n times the previously admitted amount of light will correspondingly alter the apertures of the remaining light limiting means to admit n times the light previously admitted so that the ratio of the resistance of said first photoelectric element to the resistance of said second photoelectric element, and to the resistance of said third photoelectric element, is held constant regardless of the adjustment of any one of said light limiting means.

9. The apparatus according to claim 1, wherein said second capacitor is a rotatably variable capacitor, and the apparatus further comprises first and second rotatably adjustable light limiting means positioned in front of said first and third photoelectric elements, respectively, said second capacitor being mechanically coupled to at least one of said first and second light limiting means, such that, as said at least one light limiting means is rotated to alter the aperture thereof said variable capacitor is correspondingly rotated, so that the capacitance of said capacitor is varied in proportion to the light transmission through the aperture of said at least one first and second light limiting means.

10. The apparatus according to claim 1, wherein said second capacitor is a variable capacitor and the apparatus further comprises an adjustable light limiting means, positioned in front of said first photoelectric element, said second capacitor being mechanically coupled to said light limiting means such that the capacitance of said second capacitor is varied proportionally to the light transmission through said light limiting means.

11. The apparatus according to claim 1, wherein said integrating circuit includes means for varying the threshold of said trigger circuit, the apparatus further comprising an adjustable light limiting means positioned in front of said second photoelectric element, said threshold varying means being mechanically coupled to said light limiting means such that said threshold is varied proportionally to the light transmission through said light limiting means whereby said reference voltage remains essentially constant over a wide range of light conditions.

12. The apparatus according to claim 1, wherein said integrating circuit includes means for varying the threshold of said trigger circuit, the apparatus further comprising an adjustable light limiting means positioned in front of said third photoelectric element, said threshold varying means being mechanically coupled to said light limiting means such that said threshold is varied proportionally to the light transmission through said light limiting means whereby said reference voltage remains essentially constant over a wide range of light conditions.

13. The apparatus according to claim 1, wherein said third capacitor is a variable capacitor, the capacitance of said third capacitor being varied in accordance with the exposure factors affecting the exposure of the film in said camera, whereby the correct exposure of said film is attained while keeping said reference voltage essentially constant.

14. Apparatus according to claim 1, further comprising an adjustable light limiting means positioned in front of said third photoelectric element, the light transmission through said light limiting means being varied in accordance with the exposure factors affecting the exposure of the film in said camera, whereby the correct exposure of said film is attained while keeping the reference voltage essentially constant.

* * * * *